(12) United States Patent
Choi et al.

(10) Patent No.: US 9,303,695 B2
(45) Date of Patent: Apr. 5, 2016

(54) PROPELLER SHAFT FOR VEHICLE

(71) Applicants: Hyundai Motor Company, Seoul (KR); Kia Motors Corp., Seoul (KR); Dae Seung Co., Ltd., Pyeongtaek-si (KR)

(72) Inventors: Won Jun Choi, Yangsan-si (KR); Byoung Woo Ye, Gwangmyeong-si (KR); Tae Youl Kim, Suwon-si (KR); Moon Mo Kang, Osan-si (KR)

(73) Assignees: HYUNDAI MOTOR COMPANY, Seoul (KR); KIA MOTORS CORP., Seoul (KR); DAE SEUNG CO., LTD., Gyeonggi-Do (KR)

( * ) Notice: Subject to any disclaimer, the term of this patent is extended or adjusted under 35 U.S.C. 154(b) by 35 days.

(21) Appl. No.: 14/108,099

(22) Filed: Dec. 16, 2013

(65) Prior Publication Data

US 2015/0111653 A1    Apr. 23, 2015

(30) Foreign Application Priority Data

Oct. 17, 2013    (KR) .................. 10-2013-0123955

(51) Int. Cl.
| | |
|---|---|
| B62D 1/19 | (2006.01) |
| F16C 3/02 | (2006.01) |
| F16D 9/06 | (2006.01) |
| F16D 9/08 | (2006.01) |

(52) U.S. Cl.
CPC *F16D 9/06* (2013.01); *B62D 1/192* (2013.01); *F16C 3/02* (2013.01); *F16D 9/08* (2013.01)

(58) Field of Classification Search
CPC ............. B62D 1/192; F16C 3/02; F16D 9/06; F16D 9/08
USPC ................ 464/32, 162, 179, 182, 193; 403/2, 403/359.3, 359.5, 359.6; 285/2; 280/777; 188/376; 74/492
See application file for complete search history.

(56) References Cited

U.S. PATENT DOCUMENTS 5,228,720 A *   7/1993  Sato et al. ...................... 280/777
6,666,771 B2 * 12/2003  Boutin .......................... 464/146
(Continued)

FOREIGN PATENT DOCUMENTS

JP          10-258646 A    9/1998
JP          2004-232758 A  8/2004
(Continued)

*Primary Examiner* — Josh Skroupa
(74) *Attorney, Agent, or Firm* — Morgan, Lewis & Bockius LLP

(57) ABSTRACT

A propeller shaft for a vehicle includes: a shaft having a plurality of catching protrusions for a spline-connection along an outer peripheral surface; a tube having a plurality of catching grooves along an inner peripheral surface into which the shaft is inserted; a stopper member provided to be fixed to an inner peripheral surface of the tube, one end corresponding to a remote end of the shaft and which is fractured when a collision load is applied thereto; and a locking member one end of which is in contact with one end of the stopper member and which is connected to the shaft and supports both ends of the stopper member together with the shaft, thereby restricting a sliding of the shaft, and which is slid inside the tube together with the shaft when the stopper member is fractured.

10 Claims, 7 Drawing Sheets

(56) References Cited

U.S. PATENT DOCUMENTS

| | | | |
|---|---|---|---|
| 6,666,772 B1 * | 12/2003 | Cheney et al. | 464/183 |
| 6,896,623 B2 * | 5/2005 | Creek | 464/179 |
| 6,981,919 B2 * | 1/2006 | Sugiyama et al. | 464/146 |
| 7,163,462 B2 * | 1/2007 | Okude et al. | 464/182 |
| 2004/0259645 A1 | 12/2004 | Creek | |
| 2008/0152424 A1 * | 6/2008 | Igarashi et al. | 403/359.6 |

FOREIGN PATENT DOCUMENTS

| | | |
|---|---|---|
| JP | 2004-232761 A | 8/2004 |
| JP | 2005-280604 A | 10/2005 |
| JP | 2005-313766 A | 11/2005 |
| JP | 2008-213650 A | 9/2008 |
| KR | 10-2009-0045732 A | 5/2009 |
| KR | 20-2009-0013220 U | 12/2009 |
| KR | 10-2010-0060378 A | 6/2010 |

* cited by examiner

PROPELLER SHAFT FOR VEHICLE

CROSS-REFERENCE TO RELATED APPLICATION

The present application claims priority of Korean Patent Application Number 10-2013-0123955 filed Oct. 17, 2013, the entire contents of which application is incorporated herein for all purposes by this reference.

BACKGROUND OF INVENTION

1. Field of Invention

The present invention relates to a propeller shaft for a vehicle, and more particularly, to a propeller shaft for a vehicle, capable of absorbing sufficiently length variation of the shaft to an axial direction with a low collapse load when a vehicle collision occurs and thus absorbing sufficiently collision energy, thereby reducing an injury degree of a passenger at a minimum level.

2. Description of Related Art

Generally, a propeller shaft 10 provided in a rear-wheel drive vehicle refers to a power transmission device for transferring smoothly a driving force of a power train constituting of an engine 1 and a transmission 2 to a rear axle 3, as shown in FIG. 1, wherein enough twist strength has to be ensured so as to transfer smoothly toque and also enough bending rigidity has to be ensured since the propeller shaft is long in an axial direction.

Further, except for the basic characteristics as described in the forgoing, recently safe regulations with respect to collision of a vehicle appears to be a important performance factor, that is, a technology of the propeller shaft has been developed for absorbing sufficiently length variations in an axial direction when a vehicle collision occurs and reducing injury degree of a passenger.

However, the length variation of a conventional propeller shaft 10 in an axial direction is not sufficient due to high collapse load when a vehicle collision occurs, and as a result the impact caused by the collision is not sufficiently absorbed, thereby increasing the injury degree of a passenger.

That is, the conventional propeller shaft 10, as shown in FIG. 2A and FIG. 2B, includes a front coupling 11 to be connected to a transmission 2, a front yoke 12 connected to the front coupling 11, a front tube 13 connected to the front yoke 12, a rear tube 15 connected through a universal joint 14, a rear yoke 16 connected to the rear tube 15, and a rear coupling 17 to be connected to a rear axle 3.

Here, the front tube 13 is provided with a diameter variation portion 13a processed through a swaging process wherein it is classified into a small diameter portion 13b extended toward the front yoke 12 and a large diameter portion 13c extended toward the universal joint 14 based on the diameter variation portion 13a.

The small diameter portion 13b has a smaller diameter than the large diameter portion 13c, and the small diameter portion 13b and the large diameter portion 13c are connected through the diameter variation portion 13a.

Accordingly, when the impact energy produced during a vehicle collision is transferred to the propeller shaft 10 through the power train, as shown in FIG. 3, the small diameter portion 13b is deformed to be inserted into the large diameter portion 13c while the diameter variation portion 13a is deformed, and thus the propeller shaft 10 absorbs the impact energy through the movement of the small diameter portion 13b as described in the foregoing.

However, since the diameter difference between the small diameter portion 13b and the large diameter portion 13c is not great in the conventional propeller shaft 10, the rear movement amount of the small diameter portion 13b is small and thus the length variation of the propeller shaft in an axial direction is not sufficient due to a high collapse load and the impact energy is not absorbed sufficiently, thereby increasing specially the injury degree of a passenger due to a great deceleration of a vehicle.

Accordingly, in order to make the diameter difference between the small diameter portion 13b and the large diameter portion 13c to be great, an idea that the diameter of the small diameter portion 13b is decreased or the diameter of the large diameter portion 13c is increased may be proposed, but in this case the basic strength of the propeller shaft may vary when the diameter is varied or other drawbacks in accordance with a weight or a package to the surrounding components may be produced.

Further, in order to increase the rear movement amount of the small diameter portion 13b, an idea that the collapse load is decreased by varying property of material may be proposed, but this idea becomes a cause for decreasing the basic strength of the propeller shaft 10.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to solve the above-described problems associated with prior art.

Various aspects of the present invention provide for a propeller shaft for a vehicle including: a shaft wherein along an outer peripheral surface of a section of which a plurality of catching protrusions is formed for a spline-connection; a tube wherein along an inner peripheral surface of which a plurality of catching grooves to be meshed with a plurality of catching protrusions is formed for a spline-connection; a stopper member which is provided to be fixed to an inner peripheral surface of the tube, one end of which is corresponded to a remote end of the shaft and which is fractured when a collision load is applied thereto; and a locking member one end of which is in contact with one end of the stopper member and which is connected to the shaft and supports both ends of the stopper member together with the shaft thereby restricting a sliding of the shaft, and which is slid inside the tube together with the shaft when the stopper member is fractured.

The catching protrusions of the shaft and the catching grooves of the tube may be formed in an involute gear shape, correspondingly to each other.

The tube may consist of a shaft body in a circular rod shape and a hub which is connected to one end of the shaft body and along an inner peripheral surface of which a plurality of catching grooves to be meshed with the catching protrusions is formed.

The shaft body and the hub may be connected through a friction-welding and a bead portion is formed on a connection portion of the shaft body and the hub by the friction-welding, and one end of the stopper member is in contact with the remote end of the shaft and the other end thereof is supported on the bead portion to be locked thereon.

The stopper member may be formed in a ring shape and consists of a surrounding portion to be fixed to an inner peripheral surface of the tube and a flange portion that is formed along an inner peripheral surface of the stopper member and extended toward a center thereof.

An installing groove may be formed at another side of the catching grooves on the tube, into which the stopper member is inserted to be fixed thereto wherein the surrounding portion of the stopper member is inserted into the installing groove, and the flange portion is extended in the surrounding portion to correspond to the remote end of the shaft.

A plurality of fracture grooves may be formed along a surrounding of the flange portion of the stopper member.

The plurality of fracture grooves may be formed to be corresponded to a line where an outer peripheral surface of the shaft is in contact with an inner peripheral surface of the tub.

The plurality of the fracture groove may be formed along a surrounding of the flange portion to be symmetrical up-down/left-rightward.

The locking member may consist of a head portion, which is formed to support together with the shaft both ends of the stopper member at one side of the stopper member, and a body portion which is extended toward the shaft to be fitted into the shaft.

Screw threads and screw grooves may be formed on an outer peripheral surface of the body portion of the locking member and on an inner peripheral surface of the shaft, respectively, to form a screw fastening between the locking member and the shaft.

Various aspects of the present invention provide for a propeller shaft for a vehicle that may include: a shaft wherein along an outer peripheral surface of a section of which a plurality of catching protrusions for a spline-connection is formed; a tube which consists of a hub that a plurality of catching grooves is meshed with the plurality of catching protrusions of a shaft along an inner peripheral surface of the hub, and thus forms the spline-connection, and a shaft body formed in a circular rod shape to be connected to one end of the hub, and on which a bead portion is formed by connecting the hub and the shaft body with a friction-welding; a stopper member which is provided on an inner peripheral surface of the hub, one end of which is corresponded to a remote end of the shaft and the other end of which is supported on the bead portion to be fixed thereto, and which is fractured when a collision load is applied thereto; and a locking member one end of which is in contact with one end of the stopper member and which is connected to the shaft and supports both ends of the stopper member together with the shaft, thereby restricting a sliding of the shaft, and which is slid inside the tube together with the shaft when the stopper member is fractured.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
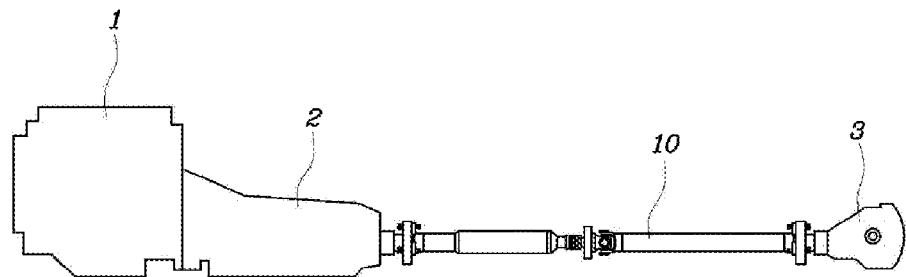
FIG. 1 is a perspective view illustrating an exemplary propeller shaft for coupling a power train and a rear axle.
Figure 2A:
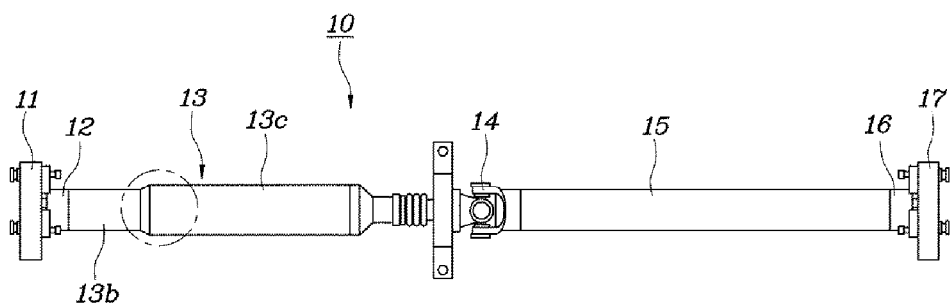
FIG. 2A and FIG. 2B are perspective views illustrating a propeller shaft according to a related art.
Figure 2B:
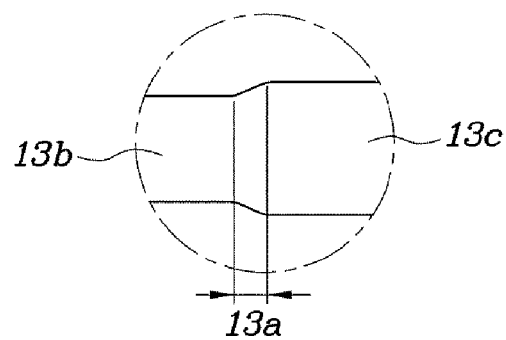

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
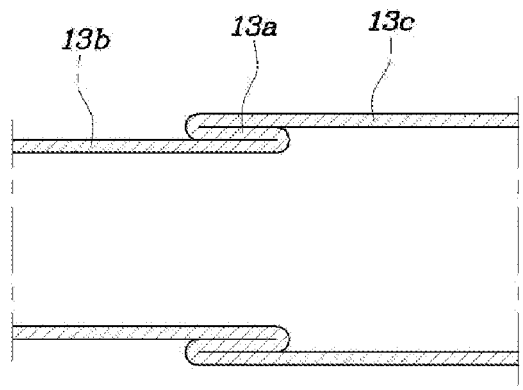
FIG. 3 is a cross-sectional view illustrating a deformed diameter variation of a front tube when a vehicle collision occurs in a conventional propeller shaft.
Figure 4A:
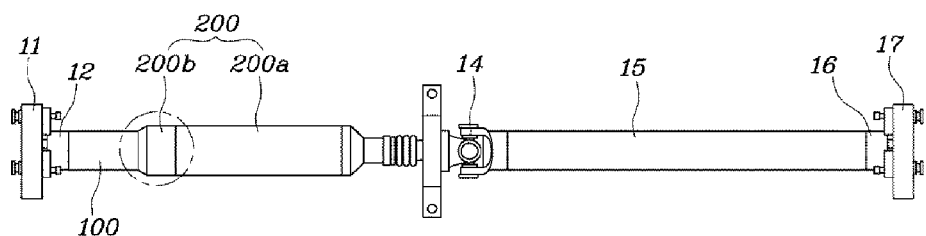
FIG. 4A and FIG. 4B are perspective views illustrating an exemplary propeller shaft for a vehicle according to the present invention.
Figure 4B:
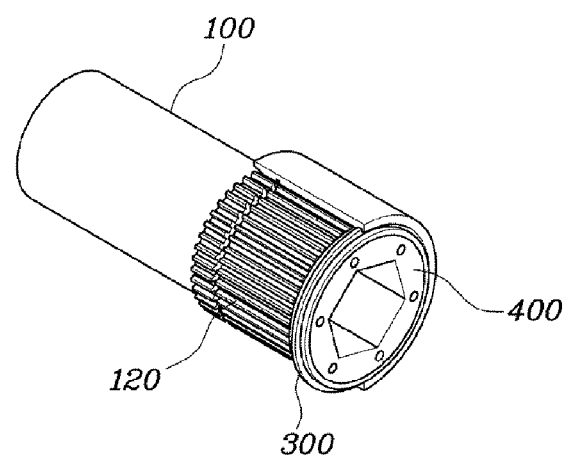
Figure 5:
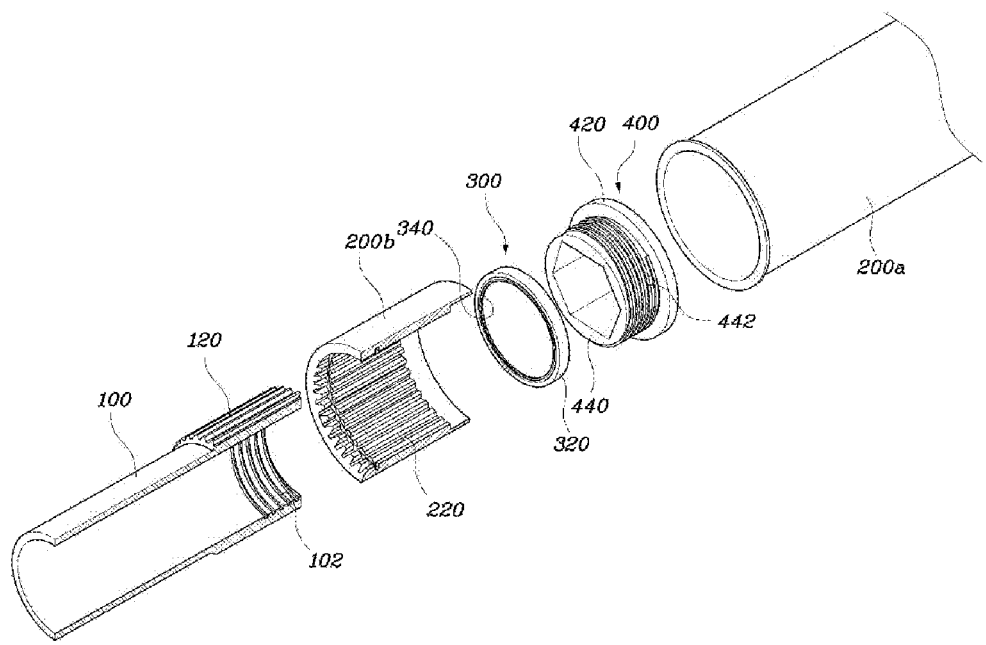
FIG. 5 is an exploded perspective view illustrating a propeller shaft for a vehicle as shown in FIG. 4A.
Figure 6:
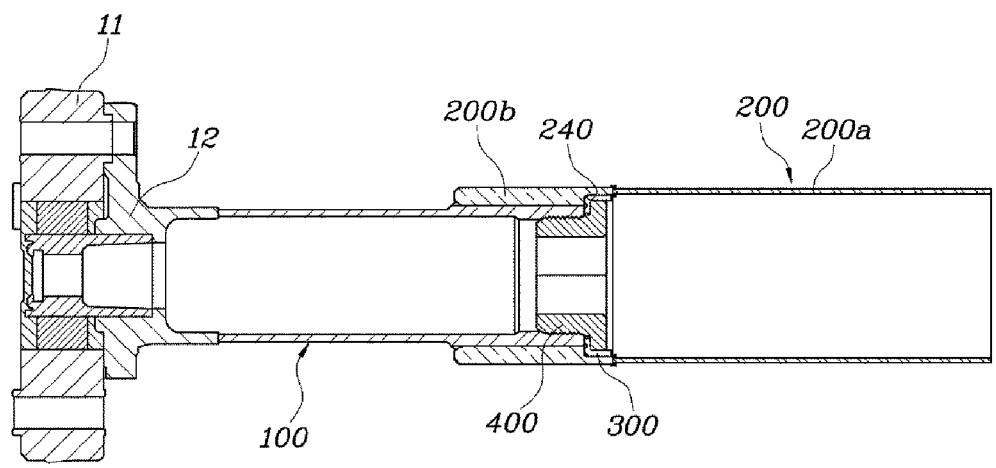
FIG. 6 is a cross-sectional view illustrating a propeller shaft for a vehicle as shown in FIG. 4A.
Figure 7:
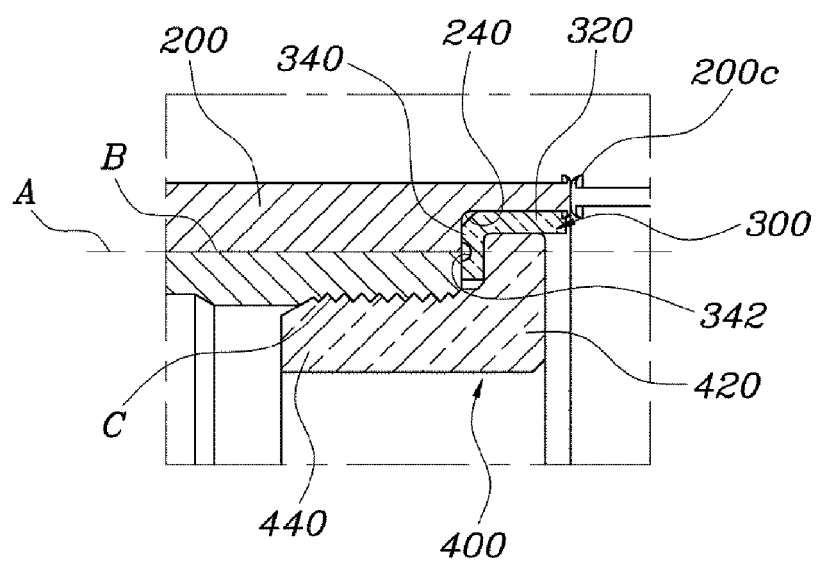
FIG. 7 is a cross-sectional view illustrating a propeller shaft for a vehicle as shown in FIG. 4A.

A propeller shaft for a vehicle according to the present invention, as shown in FIGS. 4 to 9, includes: a front coupling 11 to be connected to a transmission (2; see FIG. 1); a front yoke 12 connected to the front coupling 11; a shaft 100 one end of which is welded to the front yoke 12; a tube 200 that is spline-connected to the shaft 100; a rear tube 15 connected through a universal joint 14; a rear yoke 16 connected to the rear tube 15; and a rear coupling 17 to be connected to a rear axle (3; see FIG. 3).

In more detailed description, a propeller shaft for a vehicle according to the present invention include: a shaft 100 in which a plurality of catching protrusions 120 for a spline-connection B is formed along an outer peripheral surface of a section of the shaft; a tube 200 in which a plurality of catching grooves 220 is meshed with the plurality of catching protrusions 120 along an inner peripheral surface of the tube, and thus forms the spline-connection B; a stopper member 300 which is provided to be fixed to an inner peripheral surface of the tube 200, one end of which is corresponded to a remote end of the shaft 100 and which is fractured when a collision load is applied thereto; and a locking member 400 one end of which is in contact with one end of the stopper member 300 and it is connected to the shaft 100 and supports both ends of the stopper member 300 together with the shaft 100, thereby restricts a sliding of the shaft 100, and it is slid inside the tube 200 together with the shaft 100 when the stopper member 300 is fractured.

According to the present invention, a plurality of catching protrusions 120 is formed on an outer peripheral surface of the shaft 100 and a plurality of catching grooves 220 is formed on an inner peripheral surface of the tube 200, the caching protrusions 120 and the catching grooves 220 are meshed each other to form the spline-connection B of the shaft 100 and the tube 200. That is, the catching protrusions 120 and the catching grooves 220 are meshed to form the spline connection B between the shaft 100 and the tube 200, and thus the shaft 100 and the tube 200 are rotated simultaneously when a rotational force produced from an engine 1 is transferred thereto. As a result, even when the shaft 100 and the tube 200 are separated respectively, they are rotated simultaneously through the spline connection B and thus can transfer the rotational force produced from an engine 1 without loss.

Here, the catching protrusions 120 of the shaft 100 and the catching grooves 220 of the tube 200 may be formed in involute gear shapes, corresponding to each other.

The shaft 100 and the tube 200 according to the present invention are meshed through the catching protrusions 120 and the catching grooves 220 to transfer smoothly the rotational force, and thus may be formed in an involute gear shape. Generally, the involute gear is an efficient structure for transferring a rotational force since it has a strong teeth strength and good compatibility, and is not much influenced by biting even when there is an error, and thus the shaft and the tube are formed in an involute gear shape to transfer smoothly the rotational force and ensure twisting strength, thereby satisfying an efficient condition of the shaft 100 and the tube 200 for transferring the rotational force.

Though the catching protrusions 120 and the catching grooves 220, which are formed on the shaft 100 and the tube 200, respectively, may be formed in an involute gear shape, but they may be formed in various shapes such as an angle shape and a teeth shape.

Meanwhile, the tube 200 may be consist of a shaft body 200a in a circular rod shape and a hub 200b which is connected to one end of the shaft body 200a and along an inner peripheral surface of which a plurality of catching grooves 220 to be meshed with the catching protrusions 120 is formed.

Here, the shaft body 200a and the hub 200b are connected through a friction-welding and a bead portion 200c is formed on a connection portion of the shaft body 200a and the hub 200b by the friction-welding, and one end of the stopper member 300 is in contact with the remote end of the shaft 100 and the other end thereof is supported on the bead portion 200c to be locked thereon.

In the present invention, even though the catching grooves 220 to be meshed with the catching protrusions 120 may be formed on the shaft body 200a of the tube 200 to be connected to the shaft 100 each other, without the hub 200b, manufacturing processes are limited and cost increases and further there are difficulties in a fine forming due to material and structural characteristics of the tube 200 when the catching grooves 220 corresponding to the catching protrusions 120 are formed.

Here, the shaft body 200a and the hub 200b are connected through a friction-welding. The shaft body 200a and the hub 200b of the present invention are formed in a circular rod shape wherein it is efficient for the friction-welding, less power is consumed and efficient process is performed.

Specially, the bead portion 200c is formed on a connection portion of the shaft body 200a and the hub 200b as the friction-welding is performed wherein the stopper member 300 is locked using the bead portion 200c to restrict the movement of the stopper member 300.

The stopper member 300 is fixed to the hub of the tube 200 and restricts the movement of the shaft 100 in an axial direction at a normal time and is fractured when an impact load is applied thereto, to allow the shaft 100 to be moved. Accordingly, the stopper member 300 has to be fixed firmly to the hub 200b. Commonly, separate components may be necessary for fixing the stopper member 300 to the hub 200b, or additional processes may be required for welding the stopper member 300 and the hub 200b. However, according to the present invention, the movement of the stopper member 300 is restricted using the bead portion 200c formed by the friction-welding and thus the separate components are not necessary to save cost and reduce weight thereof, and further the shaft 100, the tube 200, the stopper member 300 and the locking member 400 can be assembled without separate processes, thereby simplifying the process and improving assembling property.

Accordingly, the tube 200 is provided separately with the hub 200b on an inner peripheral surface of which the catching grooves 220 to be corresponded to the catching protrusions 120 are formed and the hub is fixed fully to the shaft body 200a by a friction-welding, thereby saving cost and simplifying manufacturing process.

The shaft 100 and the tube 200 as configured in the forgoing are rotated simultaneously to transfer the rotational force from an engine 1 and at the same time are slid in an axial direction so as to reduce the impact transferred to a vehicle body when a vehicle collision occurs. However, the sliding of the shaft 100 and the tube 200 have to be restricted during a general driving to prevent loss of the power transmission and friction generation wherein for this purpose the stopper member 300 fixed to an inner peripheral surface of the tube 200 and the locking member 400 provided inside the tube 200, connected to the shaft 100 and supported by the stopper member 300 with being caught there over to restrict the sliding of the shaft 100, are provided.

Here, the stopper member 300 restricts the sliding of the shaft 100 in an axial direction during a general driving and is fractured by the movement of the shaft 100 caused by the collision load when a vehicle collision occurs, allowing the shaft 100 to be slid in an axial direction.

Firstly, in a description of the stopper member 300, the stopper member 300 is formed in a ring shape and consists of a surrounding portion 320 to be fixed to an inner peripheral surface of the tube 200 and a flange portion 340 that is formed along an inner peripheral surface of the stopper member and extended toward a center thereof. Here, an installing groove 240 is formed at another side of the catching grooves 220 on the tube 200, into which the stopper member 300 is inserted to be fixed thereto wherein the surrounding portion 320 of the stopper member 300 is inserted into the installing groove 240, and the flange portion 340 is extended in the surrounding portion 320 to correspond to the remote end of the shaft 100.

The stopper member 300 of the present invention is formed in a ring shape, the surrounding portion 320 is inserted into the installing groove 240 of the tube 200, and the flange portion 340 is extended toward a center to correspond to the remote end of the shaft 100, thereby restricting the shaft 100 to be slid toward the tube 200. Under this configuration, the shaft 100 is moved toward the tube due to impact load when a vehicle collision occurs, and when the moving force of the shaft 100 becomes greater than the strength of the flange portion 340, the flange portion 340 is fractured, allowing the shaft 100 to be slid.

As the shaft 100 can be slid in an axial direction as described in the forgoing, the shaft 100 is moved due to the impact load in the tube 200, thereby absorbing sufficiently the impact produced by the vehicle collision.

Meanwhile, a plurality of fracture grooves 342 may be formed along the surrounding of the flange portion 340 of the stopper member 300. The fracture grooves 342 are provided for the flange portion 340 of the stopper member 300 to be fractured smoothly due to the collision load of the shaft 100 when a vehicle collision occurs.

Here, the fracture grooves 342 may be formed to be corresponded to a line A where an outer peripheral surface of the shaft 100 is in contact with an inner peripheral surface of the tube 200.

Further, the fracture groove 342 of the stopper member 300 is formed along the surrounding of the flange portion 340 as a plurality to be symmetrical up-down/left-rightward.

The stopper member 300 of the present invention has to be fractured only when the collision load greater than a predetermined amount is applied thereto. The shaft 100 and the tube 200 are rotated simultaneously while they are connected each other and they are slid to an axial direction when a vehicle collision occurs to absorb sufficiently the impact wherein the stopper member 300 inhibits the shaft 100 to be slid during a general driving but it is fractured when the vehicle collision occurs, allowing the shaft 100 to be slid.

If a strength of the stopper member 300 is too small, the flange portion 340 may be fractured easily even due to small impact, and if the strength is too great, the flange portion 340 is not fractured even when a vehicle collision occurs thereby to inhibit the shaft 100 to be slid. Accordingly, the stopper member 300 of the present invention is to be fractured properly due to a collision amount of a predetermined level to allow the shaft 100 to be slid wherein the fracture grooves 342 are configured to adjust shear strength of the stopper member 300.

Here, the fracture grooves 342 of the stopper member 300 may be formed to be corresponded to the line A where an outer peripheral surface of the shaft 100 is in contact with an inner peripheral surface of the tube 200. The shaft 100 of the present invention is configured to be slid along an inner peripheral surface of the tube 200 when a vehicle collision occurs wherein the fracture grooves 342 of the stopper member 300 is formed to be corresponded to the line A where an outer peripheral surface of the shaft 100 is in contact with an inner peripheral surface of the tube 200, thereby guiding the stopper member 300 to be fractured smoothly by the moving force of the shaft 100 caused by the collision load.

Further, the fracture groove 342 of the stopper member 300 is formed along the surrounding of the flange portion 340 as a plurality to be symmetrical up-down/left-rightward.

The fracture grooves 342 are formed symmetrically on the flange portion 340 as described above and thus the stopper member 300 supports the shaft 100 with same load so that the stopper member 300 is guided to be fractured properly when a vehicle collision occurs, that is, the stopper member 300 is guided not to be fractured partially in any one direction.

Figure 8A:
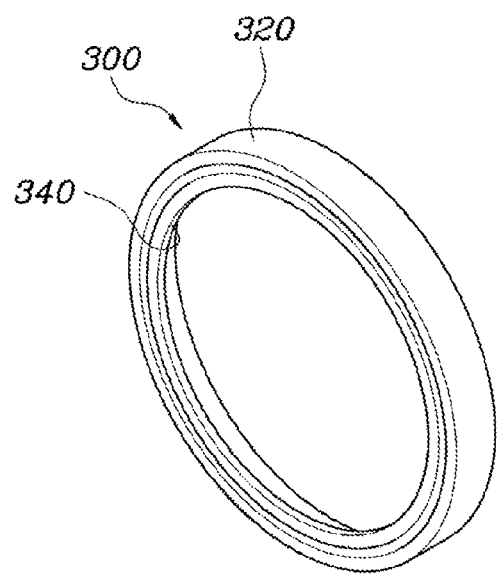
FIG. 8A, FIG. 8B, and FIG. 8C are perspective views illustrating fracture grooves formed in a stopper member in accordance with shear strength of an exemplary propeller shaft for a vehicle according to the present invention.
Figure 8B:
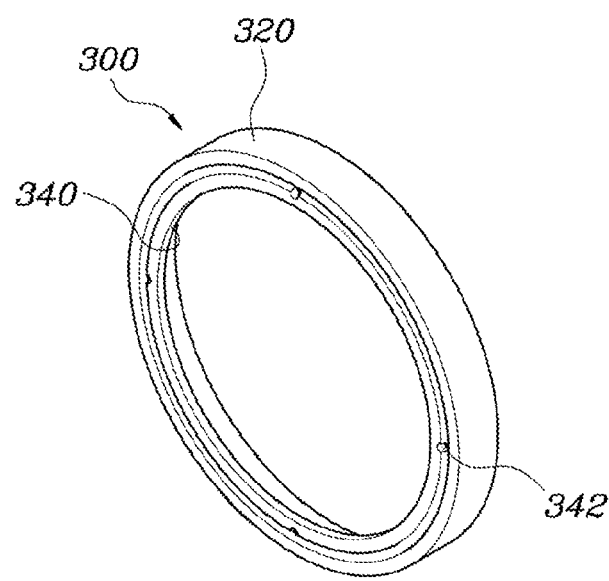
Figure 8C:
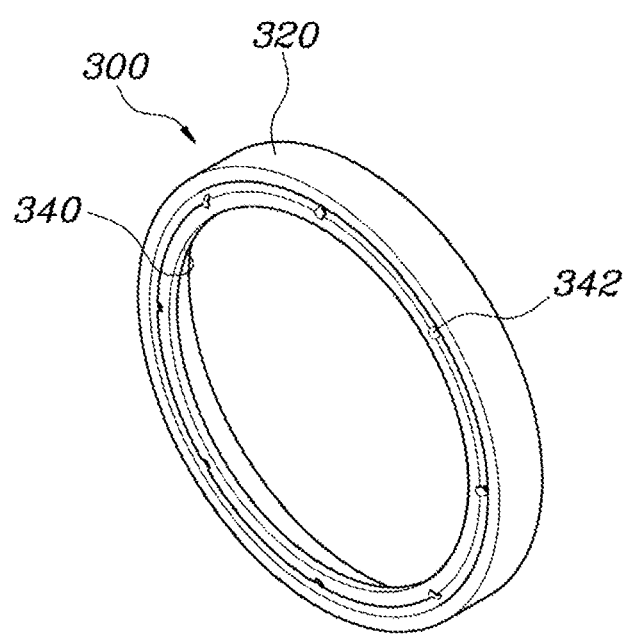

The size and number of the fracture grooves 342 formed on the stopper member 300 can be adjusted depending on specification and design of a vehicle to tune properly fracture strength of the stopper member 300 with respect to the movement of the shaft 100 when a vehicle collision occurs, as shown in FIG. 8A, FIG. 8B and FIG. 8C.

Meanwhile, the locking member 400 is provided with a head portion 420 that is formed to support, together with the shaft 100, both ends of the stopper member 300 at one side of the stopper member 300, and a body portion 440 that is extended toward the shaft 100 to be fitted into the shaft 100.

Here, screw threads 442 and screw grooves 102 may be formed on an outer peripheral surface of the body portion 440 of the locking member 400 and on an inner peripheral surface of the shaft 100, respectively, to form a screw fastening C. The shaft 100 of the present invention has to be configured for the sliding in an axial direction to be prohibited at a normal time. As described above, the movement of the shaft 100 in a tube 200 direction is restricted by the stopper member 300. Furthermore, the movement of the shaft 100 in the opposite direction of the tube 200 (to one side direction) has also to be restricted, and for this purpose the locking member 400 is provided.

The head portion 420 of the locking member 400 is in contact with the other end of the stopper member 300 to restrict the shaft 100 to be moved in one side direction and the body portion 440 that is extended toward the shaft 100 from the head portion 420 is fitted into the shaft 100, thereby restricting the shaft 100 to be moved toward one side.

As a result, the stopper member 300 is provided between the shaft 100 and the locking member 400 and further the shaft 100 and the locking member 400 are connected to each other, and thus the shaft is restricted to be moved in an axial direction at a normal time by the stopper member 300, but when a vehicle collision occurs, the stopper member 300 is fractured by the moving force of the shaft 100 and the shaft 100 is to be slid.

Here, the screw threads 442 and the screw grooves 102 are formed on an outer peripheral surface of the body portion 440 of the locking member 400 and an inner peripheral surface of the shaft 100, respectively, to form the screw fastening C.

As described above, one of the locking member 400 and the shaft 100 is pulled adjacently to the other for the locking member 400 and the shaft 100 to be clamped by the screw-fastening C and thus a gap in a rotational direction of the shaft 100 and the tube 200 can be reduced at a minimum level.

Further, even though an instant impact load due to the movement of the transmission 2 is transferred to a connection part of the locking member 400 and the shaft 100, the separation of the shaft 100 and the tube 200 can be prevented due to the strong fastening force from the screw-fastening C of the locking member 400 and the shaft 100, thereby providing a reliable safety device.

Additionally, even when an impact absorption structure is in problems, the shaft 100 and the tube 200 are kept in a continuous fastening state due to the strong fastening force from the screw-fastening C, and thus an instant urgent driving is possible.

The propeller shaft for a vehicle according to the present invention include: a shaft 100 wherein along an outer peripheral surface of a section of which a plurality of catching protrusions 120 for a spline-connection B is formed; a tube 200 which consists of a hub 200b along an inner peripheral surface of which a plurality of catching grooves 220 to be meshed with the plurality of catching protrusions 120 to form the spline-connection B is formed and a shaft body 200a which is formed in a rod shape to be connected to one end of the hub 200b, and on which a bead portion 200c is formed by connecting to the hub 200b and the shaft body 200a by a friction-welding; a stopper member 300 which is provided on an inner peripheral surface of the tube 200, one end of which is corresponded to a remote end of the shaft 100 and the other end of which is supported on the bead portion 200c to be fixed thereto, and which is fractured when a collision load is applied thereto; and a locking member 400 one end of which is in contact with one end of the stopper member 300 and which is connected to the shaft 100 and supports both ends of the stopper member 300 together with the shaft 100 thereby to restrict a sliding of the shaft 100, and which is slid inside the tube 200 together with the shaft 100 when the stopper member 300 is fractured.

Through this configuration of a propeller shaft for a vehicle, the shaft body 200*a* and the hub 200*b* are connected with low cost and simple manufacturing process and at the same time the installation and movement of the stopper member 300 can be restricted using the bead portion 200*c* formed through a friction connection.

Especially, the stopper member 300 restricts the movement of the shaft 100 at a normal time, and when a vehicle collision occurs, the shaft 100 breaks the stopper member 300 and then slides to the inside of the tube 200 wherein a length of an axial direction is varied sufficiently and thus the impact energy produced by the vehicle collision is absorbed sufficiently to reduce the impact that is transferred to a vehicle body, thereby reducing an injury degree that is given to a passenger at a minimum level.

Figure 9A:
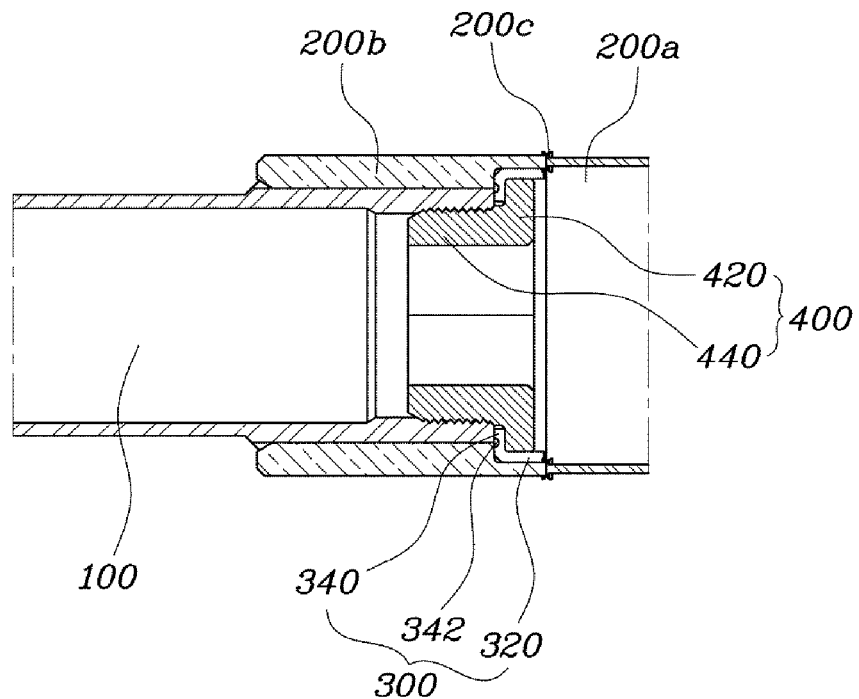
FIG. 9A and FIG. 9B are views illustrating an operating state of an exemplary propeller shaft for a vehicle according to the present invention.
Figure 9B:
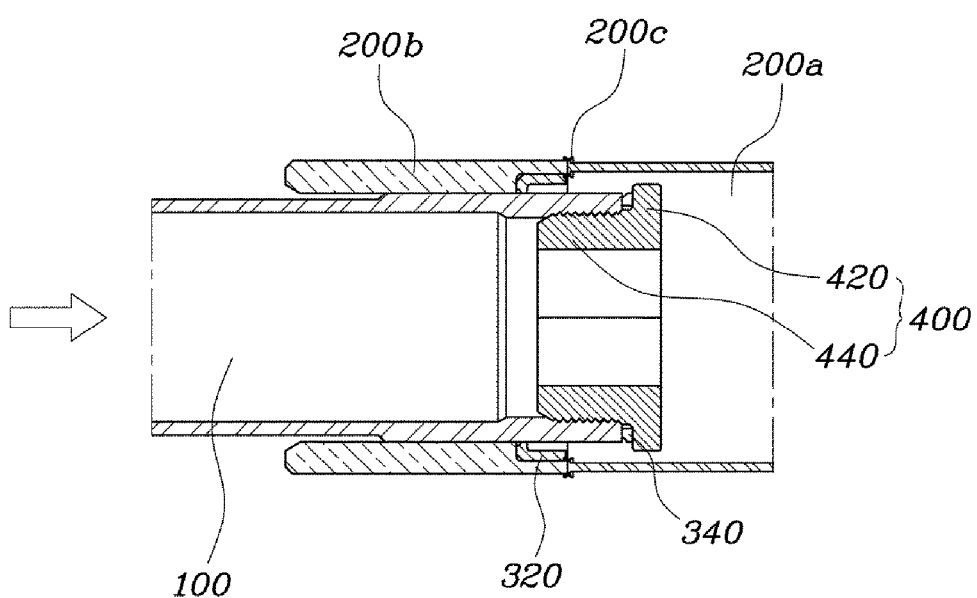

Hereinafter, an operation of the propeller shaft for a vehicle as described above will be described. FIG. 9A and FIG. 9B are views illustrating compression amounts of the propeller shaft after and before a vehicle collision. Referring to FIG. 9A and FIG. 9B, the movement of the shaft 100 and the tube 200 in an axial direction is restricted by the stopper member 300 and the locking member 400 while the shaft 100 and the tube 200 are connected, and when a vehicle collision occurs, the stopper member 300 for restricting the sliding of the shaft 100 is fractured and thus the shaft 100 is inserted into the tube 200. As described above, the propeller shaft is inserted into the tube 200 when a vehicle collision occurs and a length of the shaft 100 is varied sufficiently in an axial direction, and thus the impact caused when a vehicle collision occurs is absorbed sufficiently with its movement of the shaft 100. In the propeller shaft, when a part of the length of the shaft 100 which is inserted into the tube 200 is adjusted, variation amount of the propeller shaft to an axial direction can be adjusted and thus it can be applied to various kinds of vehicles.

That is, according to the present invention, the shaft 100 and the tube 200 are rotated simultaneously through the spline connection B and thus the rotational force produced from the engine 1 can be transferred without loss, and as the stopper member 300 for restricting the movement of the shaft 100 when a vehicle collision occurs is fractured, the shaft 100 is moved in an axial direction in the tube 200, thereby satisfying a condition where the impact is absorbed efficiently.

According to the present invention, a length of an axial direction of the propeller shaft is varied sufficiently and thus the impact energy produced by the vehicle collision is absorbed sufficiently to reduce the impact that is transferred to a vehicle body, thereby reducing an injury degree that is given to a passenger at a maximum level.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A propeller shaft for a vehicle comprising:
a shaft including a plurality of catching protrusions formed on an outer peripheral surface;
a tube including a plurality of catching grooves on an inner peripheral surface thereof, the plurality of catching grooves meshing with the plurality of catching protrusions to define a spline-connection;
a stopper member fixed to the inner peripheral surface of the tube, a first end of said stopper member corresponding to and directly contacting a remote end of the shaft, said stopper member fracturing when a collision load is applied thereto; and
a locking member including one end in contact with the first end of the stopper member and which is connected to the shaft and supports the stopper member together with the shaft thereby restricting sliding of the shaft, and which is configured to slide inside the tube together with the shaft when the stopper member is fractured,
wherein the tube comprises a shaft body in a circular rod shape and a hub which is connected to one end of the shaft body and along an inner peripheral surface formed by the plurality of catching grooves to be meshed with the plurality of catching protrusions,
wherein the shaft body and the hub are connected through a friction-welding and a bead portion is formed on a connection portion of the shaft body and the hub by the friction-welding,
wherein a second end of the stopper member is supported on the bead portion of the shaft body.

2. The propeller shaft for the vehicle of claim 1, wherein the plurality of catching protrusions of the shaft and the plurality of catching grooves of the tube are formed with respective gear shapes.

3. The propeller shaft for the vehicle of claim 1, wherein the stopper member is formed in a ring shape and comprises a surrounding portion configured to be fixed to the inner peripheral surface of the tube and a flange portion that is formed along an inner peripheral surface of the stopper member and extended toward a center thereof.

4. The propeller shaft for the vehicle of claim 3, wherein an installing groove is formed at a side of the plurality of catching grooves on the tube, into which the stopper member is inserted to be fixed thereto wherein the surrounding portion of the stopper member is inserted into the installing groove, and the flange portion is extended in the surrounding portion to correspond to the remote end of the shaft.

5. The propeller shaft for the vehicle of claim 3, wherein a plurality of fracture grooves is formed along a surrounding of the flange portion of the stopper member.

6. The propeller shaft for the vehicle of claim 5, wherein the plurality of fracture grooves is formed along a line where the outer peripheral surface of the shaft is in contact with the inner peripheral surface of the tube.

7. The propeller shaft for the vehicle of claim 5, wherein the plurality of the fracture grooves is formed along a surrounding of the flange portion to be symmetrical.

8. The propeller shaft for the vehicle of claim 1, wherein the locking member comprises a head portion, which is formed to support, together with the shaft, the stopper member at one side of the stopper member, and a body portion which is extended toward the shaft to be fitted into the shaft.

9. The propeller shaft for the vehicle of claim 8, wherein screw threads and screw grooves are formed on an outer peripheral surface of the body portion of the locking member and on an inner peripheral surface of the shaft, respectively, to form a screw fastening between the locking member and the shaft.

10. A propeller shaft for a vehicle comprising:
a shaft including a plurality of catching protrusions formed on an outer peripheral surface;
a tube including a plurality of catching grooves on an inner peripheral surface thereof, the plurality of catching grooves meshing with the plurality of catching protrusions to define a spline-connection;
a stopper member fixed to the inner peripheral surface of the tube, a first end of said stopper member corresponding to and directly contacting a remote end of the shaft, said stopper member fracturing when a collision load is applied thereto; and
a locking member including one end in contact with the first end of the stopper member and which is connected to the shaft and supports the stopper member together with the shaft thereby restricting sliding of the shaft, and which is configured to slide inside the tube together with the shaft when the stopper member is fractured, said locking member comprising a head portion formed to support, together with the shaft, the stopper member at one side of the stopper member, and a body portion which is extended toward the shaft to be fitted into the shaft,
wherein the tube comprises a shaft body in a circular rod shape and a hub which is connected to one end of the shaft body and along an inner peripheral surface formed by the plurality of catching grooves to be meshed with the plurality of catching protrusions,
wherein the shaft body and the hub are connected through a friction-welding and a bead portion is formed on a connection portion of the shaft body and the hub by the friction-welding,
wherein a second end of the stopper member is supported on the bead portion of the shaft body, and
wherein screw threads and screw grooves are formed on an outer peripheral surface of the body portion of the locking member and on an inner peripheral surface of the shaft, respectively, to form a screw fastening between the locking member and the shaft.

\* \* \* \* \*